(12) United States Patent
Ju et al.

(10) Patent No.: US 12,014,545 B2
(45) Date of Patent: Jun. 18, 2024

(54) MEDIA PROCESSING METHOD AND MEDIA SERVER

(71) Applicant: Huawei Technologies Co., Ltd., Shenzhen (CN)

(72) Inventors: Zengwei Ju, Dongguan (CN); Hang Sun, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 408 days.

(21) Appl. No.: 17/406,122

(22) Filed: Aug. 19, 2021

(65) Prior Publication Data

US 2021/0383126 A1 Dec. 9, 2021

Related U.S. Application Data

(63) Continuation of application No. PCT/CN2019/125426, filed on Dec. 14, 2019.

(30) Foreign Application Priority Data

Mar. 25, 2019 (CN) .......................... 201910228713.6

(51) Int. Cl.
*G06V 20/40* (2022.01)
*G06T 5/50* (2006.01)
(Continued)

(52) U.S. Cl.
CPC ................ *G06V 20/46* (2022.01); *G06T 5/50* (2013.01); *G06T 5/70* (2024.01); *G06T 7/11* (2017.01);
(Continued)

(58) Field of Classification Search
CPC .... G06V 20/46; G06V 2201/07; G06T 5/002; G06T 5/50; G06T 7/11;
(Continued)

(56) References Cited

U.S. PATENT DOCUMENTS 10,679,428 B1 * 6/2020 Chen .................... G06F 18/2413
2007/0279494 A1 * 12/2007 Aman ..................... G06V 20/40
348/169

(Continued)

FOREIGN PATENT DOCUMENTS

CN 1916566 A * 2/2007 ............... B63C 9/08
CN 102204243 A 9/2011
(Continued)

OTHER PUBLICATIONS

Zhang, H., et al., "Object-Level Video Advertising: An Optimization Framework," IEEE Transactions on Industrial Informatics, vol. 13, No. 2, Apr. 2017, 12 pages.
(Continued)

*Primary Examiner* — Mahendra R Patel
(74) *Attorney, Agent, or Firm* — Conley Rose, P.C.

(57) ABSTRACT

A media processing method includes determining, by the media server based on a first network model, a first object existing in a first video to implement automatic detection of an object. The first network model is based on a sample image that includes the first object determining, by the media server from a media set, first media that matches the first object, where the first object is associated with content of the first media, and covering, by the media server, a target region of the first video with the first media to generate an integrated video file.

20 Claims, 5 Drawing Sheets

(51) Int. Cl.
*G06T 5/70* (2024.01)
*G06T 7/11* (2017.01)

(52) U.S. Cl.
CPC ............... *G06T 2207/10016* (2013.01); *G06V 2201/07* (2022.01)

(58) Field of Classification Search
CPC ...... G06T 2207/10016; G06Q 30/0241; H04N 21/234363; H04N 21/251; H04N 21/4316; H04N 21/812; H04N 21/23418; H04N 21/23424
USPC ............................................................ 382/103
See application file for complete search history.

(56) References Cited

U.S. PATENT DOCUMENTS

| | | | | |
|---|---|---|---|---|
| 2009/0232354 | A1* | 9/2009 | Camp, Jr. | ............... G06Q 30/02 382/103 |
| 2014/0201126 | A1* | 7/2014 | Zadeh | ................... A61B 5/165 706/52 |
| 2014/0310097 | A1* | 10/2014 | Nomura | ............... G06V 10/462 705/14.49 |
| 2014/0359656 | A1* | 12/2014 | Banica | ................. H04N 21/234 725/32 |
| 2015/0106856 | A1* | 4/2015 | Rankine | ............. H04N 21/8456 725/60 |
| 2017/0180771 | A1* | 6/2017 | Gilley | ............. H04N 21/44224 |
| 2018/0020247 | A1* | 1/2018 | Zhang | ............ H04N 21/234318 |
| 2018/0122114 | A1* | 5/2018 | Luan | ................ H04N 21/44016 |
| 2019/0007724 | A1* | 1/2019 | Tidwell | .................. G06Q 30/02 |
| 2019/0073520 | A1* | 3/2019 | Ayyar | .................. G06V 40/173 |
| 2019/0075339 | A1* | 3/2019 | Smith | ............. H04N 21/25883 |

FOREIGN PATENT DOCUMENTS

| | | | | |
|---|---|---|---|---|
| CN | 103024479 | A | | 4/2013 |
| CN | 103400284 | A * | 11/2013 | |
| CN | 103400284 | A | | 11/2013 |
| CN | 104735465 | A | | 6/2015 |
| CN | 104918060 | A | | 9/2015 |
| CN | 104967885 | A * | 10/2015 | ......... G06K 9/00362 |
| CN | 104967885 | A | | 10/2015 |
| CN | 107343211 | A | | 11/2017 |
| CN | 108174165 | A * | 6/2018 | |
| CN | 109461174 | A | | 3/2019 |
| WO | 9510919 | A1 | | 4/1995 |
| WO | 2013089146 | A1 | | 6/2013 |
| WO | WO-2015161758 | A1 * | 10/2015 | ....... H04N 21/23418 |

OTHER PUBLICATIONS

Hongwei, G., et al., "Electronic Packaging Technology and Equipment Technology Basic Course," eXidian University Press, Jul. 2017, with an English machine translation, 15 pages.

Jiuqiang, H., et al., "Digital image processing: based on XAVIS configuration software," Xi''an Jiaotong University Press, Jan. 8, 2018, with an English machine translation, 4 pages.

* cited by examiner

MEDIA PROCESSING METHOD AND MEDIA SERVER

CROSS-REFERENCE TO RELATED APPLICATIONS

This is a continuation of International Patent Application No. PCT/CN2019/125426 filed on Dec. 14, 2019, which claims priority to Chinese Patent Application No. 201910228713.6 filed on Mar. 25, 2019. The disclosures of the aforementioned applications are hereby incorporated by reference in their entireties.

TECHNICAL FIELD

This application relates to the field of communications technologies, and in particular, to a media processing method and a media server.

BACKGROUND

With progress of network and multimedia technologies and wide use of diversified terminal devices, a video service becomes a part that occupies a relatively large proportion of content in media information of all types. Usually, some media, such as a picture, a video, and audio, is implanted in a video playing process.

Picture-type media implantation is used as an example, there are many manners of implanting picture-type media into a video. Conventionally, a covering implantation manner and an insertion implantation manner are used. However, these two conventional manners affect a user watching a video and cause user dissatisfaction. There is a tendency to implant picture-type media into video content, to ensure that a user can view advertisement content while normally watching a video, which can improve user experience.

However, in a current picture-type media implantation manner, manual intervention is required. For example, a specialized person needs to be assigned to determine an advertisement position or a manually marked region in a video. Then, picture-type media is implanted into the advertisement position or the marked region.

In conclusion, an existing media implantation manner requires manual intervention, is relatively inflexible, and has relatively low implantation efficiency.

SUMMARY

This application provides a media processing method and a media server, to resolve a problem that a media implantation manner requires manual intervention and has relatively low implantation efficiency.

According to a first aspect, an embodiment of this application provides a media processing method. The method includes a media server determines, based on a first network model, a first object existing in a first video, where the first network model may be preconfigured, and is generated through training based on a sample image that is determined to include the first object, the media server determines, from a media set, first media that matches the first object, where the first object is associated with content of the determined first media, and the media server may cover a target region of the first video with the first media, to generate an integrated video file, where the integrated video file includes the first video and the first media.

According to the foregoing method, the media server may automatically detect the first object by using the first network model, and may further automatically perform matching to determine the first media, so that a media implantation method can be automatically implemented without manual intervention. This improves media implantation efficiency. There is an association between the content of the first media and the first object, so that media implanted in the first video can be more targeted.

In a possible design, in a training process of the first network model, the sample image is used as an input, and a label of the sample image is used as an output. The label of the sample image is predetermined and is used to indicate whether the first object exists in the sample image. Different values in the label are corresponding to a case in which the first object exists in the sample image and a case in which the first object does not exist in the sample image. When the first network model processes the first video, the first video is used as an input. For example, each image frame in the first video is used as an input, and a first label is used as an output. The first label is used to indicate that the first object exists in the first video, for example, indicate that the first object exists in the image frame in the first video.

According to the foregoing method, when the first network model is used, it can be conveniently determined, through the first label, that the first object exists in the first video, and no dedicated person is assigned in a determining process. Further, media implantation efficiency and flexibility can be improved.

In a possible design, when determining, from the media set, the first media that matches the first object, the media server may first determine a feature vector corresponding to the first object and a feature vector corresponding to each media in the media set. The feature vector corresponding to the first object may represent an attribute of the first object, and the feature vector corresponding to the media represents an attribute of the media. The attribute includes but is not limited to text information, image information, and the like. For example, a second network model used to output a feature vector may be set in the media server, and the media server determines, based on the second network model, the feature vector corresponding to the first object and the feature vector corresponding to each media in the media set. Then, the media server determines a distance value between the feature vector corresponding to the first object and the feature vector corresponding to each media in the media set. The distance value may essentially represent a similarity between the attribute of the first object and the attribute of the media. After the distance value is determined, the media server may use media as the first media, where a distance value between a feature vector corresponding to the media in the media set and the feature vector corresponding to the first object meets a condition.

According to the foregoing method, degrees of correlation between the first object and each media in the media set can be conveniently determined by setting the second network model. In this way, the first media can be accurately determined, and the first media integrated in the first video is more targeted.

In a possible design, the feature vector is a word vector. The word vector corresponding to the first object may represent a name of the first object, and the word vector corresponding to each media in the media set may represent content of the media, for example, text information, a keyword, or a statement of the media, or information to be conveyed by the media.

According to the foregoing method, the name of the first object and the content of each media can be more intuitively reflected by using the word vector, so that the first media whose content is correlated to the first object can be determined relatively quickly.

In a possible design, the condition may include some or all of the following: the distance value is minimum and the distance value is within a preset range.

According to the foregoing method, that the distance value is relatively small or the distance value is in a relatively small range may represent that the media is relatively correlated with the first object, and the first media can be better selected.

In a possible design, in addition to implanting the first media into the first object, the media server may further determine another object. For example, the media server may further detect a second object in the first video, where the second object may be a display location that can display media. Then, the media server covers a region in which the second object is located with second media, to generate an integrated video file.

According to the foregoing method, when the display location that can display the media exists in the first video, the media server may relatively accurately integrate the second media into the display location. In this process, the manual intervention is also not required, so that media processing efficiency is improved.

In a possible design, if the media server needs to detect a second object in the first video, the media server needs to determine that each image frame in the second object exists in the first video. For example, the media server may detect the second object in any image frame in the first video. An example in which any image frame in the first video is a first image frame is used. The media server detects the second object in the first image frame, and determines, by using a tracking algorithm, the second object in an image frame in the first video other than the first image frame.

According to the foregoing method, the media server only needs to determine the second object in one image frame, and then may conveniently determine, by using the tracking algorithm, remaining image frames in which the second object exists in the first image. The image frames do not need to be determined frame by frame. Therefore, each image frame in which the second object exists in the first video can be determined relatively quickly, so that a manner of detecting the second object is more efficient.

In a possible design, when the media server covers the region in which the second object is located with the second media, for any image frame in which the second object exists in the first video, the media server may cover a region in which the second object is located with the second media.

According to the foregoing method, it can be ensured that the second media can be implanted in any image frame in which the second object exists.

In a possible design, after covering the region in which the second object is located with the second media, the media server performs Gaussian smoothing on an edge of the second media, to generate an integrated video file.

According to the foregoing method, there is a transition between the edge of the second media and the first video, so that a final display effect of the second media is better.

According to a second aspect, an embodiment of this application further provides a media server. For beneficial effects, refer to the description in the first aspect. Details are not described herein again. The apparatus has a function of implementing an action in the method example in the first aspect. The function may be implemented by hardware, or may be implemented by hardware executing corresponding software. The hardware or software includes one or more modules corresponding to the function. In a possible design, a structure of the apparatus includes a determining unit, a matching unit, an integration unit, and a detection unit. The units may execute corresponding functions in the method example in the first aspect. For details, refer to the detailed descriptions in the method example. Details are not described herein again.

According to a third aspect, an embodiment of this application further provides a media processing apparatus. For beneficial effects, refer to the description in the first aspect. Details are not described herein again. A structure of the media processing apparatus includes a processor and a memory, and may further include a transceiver. The processor is configured to support the terminal device in performing a corresponding function in the method in the first aspect. The memory is coupled to the processor, and the memory stores a program instruction and data that are necessary for media processing. The transceiver is configured to communicate with another device, and may further include a display configured to receive an instruction of the processor and display an image, for example, display an integrated file.

According to a fourth aspect, this application further provides a computer-readable storage medium, where the computer-readable storage medium stores instructions, and when the instructions are run on a computer, the computer is enabled to perform the method in the foregoing aspect.

According to a fifth aspect, this application further provides a computer program product including instructions, and when the instructions are run on a computer, the computer is enabled to perform the method in the foregoing aspect.

According to a sixth aspect, this application further provides a computer chip. The chip is connected to a memory. The chip is configured to read and execute a software program stored in the memory, to perform the method in the foregoing aspect.

DESCRIPTION OF EMBODIMENTS

This application provides a media processing method and a media server, to resolve a technical problem in the conventional technology that a media implantation manner requires manual intervention and has relatively low implantation efficiency.

Figure 1:
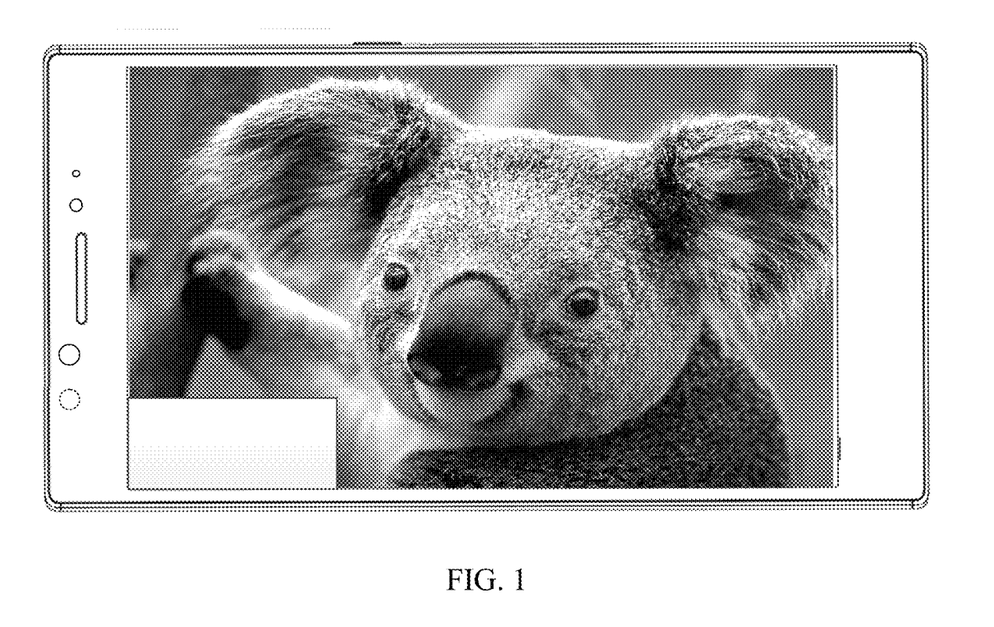
FIG. 1 is a schematic diagram of a location of media implantation.

FIG. 1 shows a video playing interface. To implant media such as a picture, a video, and audio, in a video playing process, especially in the field of advertisement or poster production, in an existing solution, a region in which the media can be implanted needs to be first selected from the video playing interface. In this case, manual confirmation is required, for example, a location of a blank region at the lower left corner is manually selected as a media display region. Precise coordinates of the media display region still need to be determined, to implant the media more accurately. Then, the media that needs to be displayed is integrated into the determined location based on the media that needs to be displayed.

It can be learned from the foregoing media implantation process that, in the existing solution, manual intervention is always required from that a media display location is determined to that the media is integrated in a video. This media implantation manner is relatively inflexible, takes a relatively long time, and has a limited application scope.

Therefore, embodiments of this application provide a media processing method and a device, to implement automatic detection of an object in a video, media automatic matching, and integration of media and the video. In the embodiments of this application, a media server may preset a network model (a first network model is used as an example in the embodiments of this application), and determine, by using the first network model, a candidate object that exists in a first video and that can be associated with content of media (a first object is used as an example in the embodiments of this application). Then, first media that matches the first object is determined from a media set that includes media that needs to be implanted. Then, the media server covers a target region of the first video with the first media, to generate an integrated video file. According to the method in the embodiments of this application, the media server determines the object based on the preset network model, automatically matches the first media from the media set, and then implants the first media without the manual intervention, so that media implantation efficiency can be improved. The implanted first media matches the first object, so that the implanted first media can be more targeted.

In the embodiments of this application, the media server may be a remote server deployed in a cloud, or may be a server that is disposed in a network and that can provide a service, for example, a super multi-core server, a computer deployed with a graphics processing unit (GPU) cluster, a large distributed computer, or a cluster computer with hardware resource pooling. A specific form of the media server is not limited in the embodiments of this application. Any media server that can implement the media processing method in the embodiments of this application is applicable to the embodiments of this application.

Media involved in the embodiments of this application, for example, the first media, second media, and each media in the media set, may be a picture, a dynamic image, a video (duration of the video is not limited), and the like.

Figure 2:
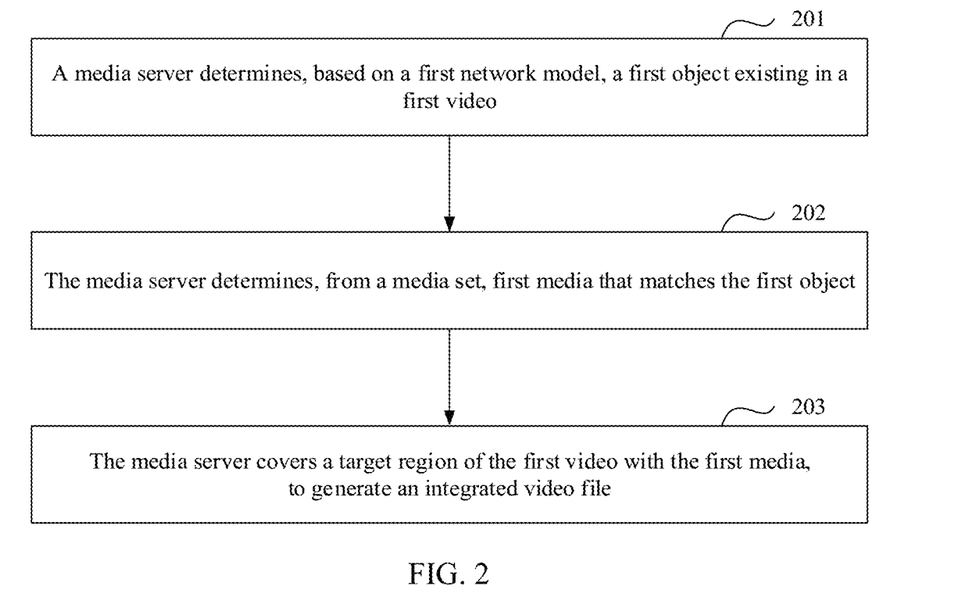
FIG. 2 is a schematic diagram of a media processing method according to this application.

The following describes a media processing method provided in an embodiment of this application with reference to the accompanying drawings. As shown in FIG. 2, the method includes the following steps.

Step 201: A media server determines, based on a first network model, a first object existing in a first video, where the first network model is preconfigured and is generated through training based on a sample image that is determined to include the first object.

The first object may be an object that can be associated with content of some media and that is in the first video. For example, the first object is a target object in the first video, for example, a dog, a man, a woman, a child, or an elderly person.

Step 202: The media server determines, from a media set, first media that matches the first object, where the first object is associated with content of the first media.

For example, if the first object is the dog, the first media may be dog food, audio and video of a pet advertisement, an image, or the like.

Step 203: The media server covers a target region of the first video with the first media, to generate an integrated video file.

The target region may be a region that is pre-marked in the first video and that is used to display media. For example, the target region may be one or more of the four top corner regions of the first video, or may be a region of the lower half part of the first video. A specific location of the target region is not limited in this embodiment of this application. A region that has relatively small impact on playing of the first video may be selected as the target region based on displayed content of the first video.

Types and a quantity of first objects are not limited in this embodiment of this application. The media server may determine a plurality of different types of first objects from the first video based on the first network model, and a quantity of the determined first objects is related to the first network model in addition to an image frame in the first video. The first network model is used to identify the first object in the video, and a quantity and types of first objects that can be identified are related to a training manner and composition of the first network model. The first network model may be a neural network model.

A manner of generating the first network model through training is briefly described by using an example in which the first network model is the neural network model and a device that generates the first network model is the media server.

It should be noted that the device that generates the first network model is not limited in this embodiment of this application. Alternatively, another server may generate the first network model through training, and then send the first network model to the media server.

First, the media server establishes a sample set, where the sample set includes a plurality of sample images.

Whether each sample image includes the first object and a type of the included first object have been pre-marked in the sample image.

For example, a label may be set for each sample image. The label may be in a form of a vector, and each element in the vector corresponds to one type of the first object. For example, the vector includes three elements. A first object corresponding to a first element is a person, a first object corresponding to a second element is a dog, and a first object corresponding to a third element is a cat. When a value of any element is 1, it represents that the first object corresponding to the element exists in the sample image. When a value of any element is 0, it represents that the first object corresponding to the element does not exist in the sample image. For example, if a label of a sample image is {1, 0, 0}, it indicates that there is a person in the sample image, and there is no dog or cat in the sample image.

The foregoing type of the first object is merely an example. In a specific implementation, classification of the first object may be further refined based on a specific requirement. For example, persons may be classified into a teenager, an adult, a student, a child, and a baby, and dogs may be classified into a golden retriever, a husky, and a Labrador retriever.

Then, the media server trains the first network model.

A sample image in the sample set is used as an input value of the first network model, and a label of the corresponding sample image in the sample set is used as an output value of the first network model. The first network model is trained by using a stochastic gradient descent method, to determine a weight of the first network model.

It should be noted that, in a process in which the first network model is trained, a type of the first object that can be identified by the first network model is related to the label set on the sample image. A larger quantity of elements included in the label indicates that a larger quantity of types of first objects are determined.

After the training of the first network model is completed, the first network model can be used to determine whether the first object exists in the first video, and the first video is used as an input of the first network model. For example, each image frame in the first video may be input into the first network model, and an output of the first network model is the first label. The first label is used to indicate the first object existing in the first video. Further, the first label may indicate that the first object exists in one or more image frames in the first video.

Composition of the first network model is not limited in this embodiment of this application. For example, the first network model may be a neural network model including several convolutional layers, or may be a neural network model with a known structure, for example, a SmallerVGG-Net network model.

The following uses an example in which the first network model is the SmallerVGGNet network model to describe a process in which the first network model processes the first video. The SmallerVGGNet model includes three convolutional layers, two max pooling layers, three Dropout layers, one Faltten layer, and two fully connected layers.

Figure 3:
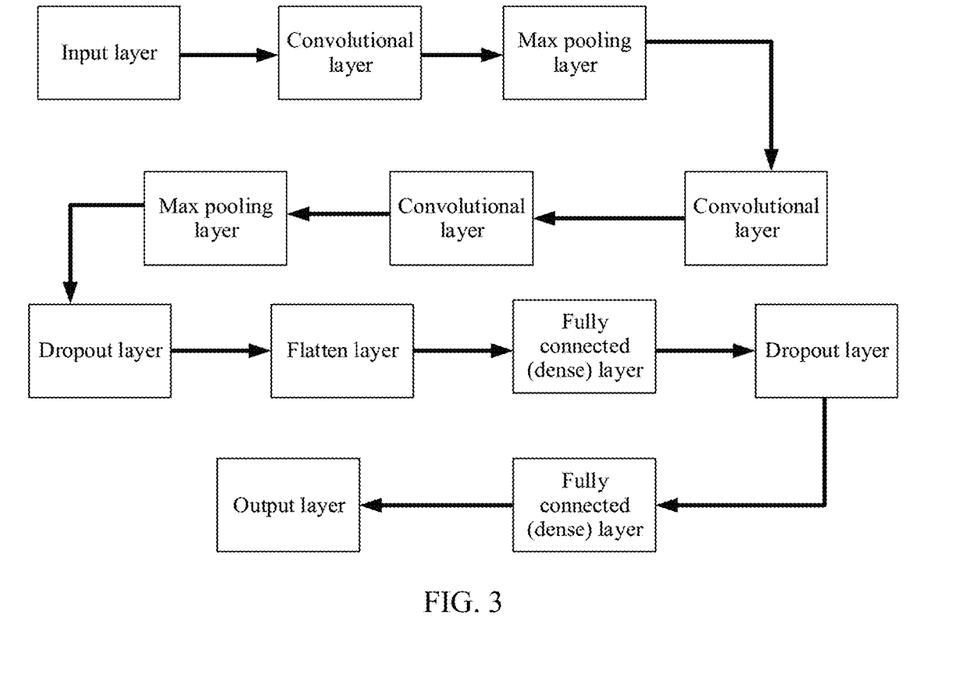
FIG. 3 is a schematic structural diagram of a first network model according to this application.

FIG. 3 shows a processing procedure of the SmallerVGG-Net network model. In the SmallerVGGNet network model, a connection sequence of the layers from an input to an output is as follows: an input layer, a convolutional layer, a max pooling layer, a dropout layer, a convolutional layer, a convolutional layer, a max pooling layer, a dropout layer, a flatten layer, a fully connected (dense) layer, a dropout layer, a fully connected layer, and an output layer.

The convolutional layer is used to extract features of an image. The max pooling layer can retain main features of the image, and can further reduce parameters (to achieve a dimensionality reduction effect) and a calculation amount that are introduced in a processing process. Introduction of the max pooling layer can prevent overfitting of the neural network model, and can further improve a generalization ability of the neural network model. The dropout layer is used to mitigate overfitting and achieve regularization to some extent.

The flatten layer is used to convert a two-dimensional (2D) feature output by the convolutional layer into a one-dimensional (1D) structure of the fully connected layer. The fully connected layer is used for output classification.

In this embodiment of this application, for some video playing platforms such as a video website and a television station, some media needs to be displayed for played content in a video playing process. To pertinently display some media, after processing the first media and determining the first object in the first video, the media server needs to determine the first media that matches the first object.

For example, a media set may be configured on a local media server or another media server. The media set may include a plurality of pieces of to-be-played media, and the media server may determine the matched first media from the media set.

Correspondences between the media in the media set and different types of first objects may be preset. For example, after the media set is determined, the media server may pre-determine correspondences between each media in the media set and the first objects. For example, first objects corresponding to a picture or a video of a maternal and infant type in the media set are babies. First objects corresponding to a picture or a video of a dog food type in the media set are a golden retriever, a husky, and a Labrador retriever. First objects corresponding to a picture or a video of a beer type in the media set are a football and a basketball.

The media server may determine, according to the pre-configured correspondences between the first objects and the media in the media set, the first media that matches the first objects in the video.

The foregoing manner of presetting the correspondences between different first objects and the media in the media set is merely an example, and another manner of determining the first media from the media set is not limited in this embodiment of this application. The following describes another manner of determining the first media provided in this embodiment of this application.

The media server may configure another network model (a second network model is used as an example in this embodiment of this application). The second network model may be used to output a feature vector, and the feature vector may represent an attribute of an input value of the second network model, for example, text information (such as a name, a keyword, and content of the input value), image information, and the like of the input value of the second network model. For example, the feature vector is a word vector, and the word vector may represent the text information (such as the name, the keyword, and the content of the input value) of the input value of the second network model.

The media server determines, based on the second network model, a feature vector corresponding to the first object and a feature vector corresponding to each advertisement in the media set, and then, determines a distance value between the feature vector corresponding to the first object and a feature vector corresponding to each media in the media set, where media whose distance value meets a condition is the first media.

Because the feature vector corresponding to the first object represents an attribute of the first object, the feature vector corresponding to each media in the media set represents an attribute of the media. A distance value between the feature vector corresponding to the first object and a feature vector corresponding to any media may reflect a degree of similarity between the attribute of the first object and an attribute of any media. If a distance value between the feature vector corresponding to the first object and a feature vector corresponding to an advertisement is smaller, it indicates that the attribute of the first object is similar to an attribute of the media. For example, the feature vector is a word vector. Further, the feature vector corresponding to the first object is used to represent a name of the first object, and the feature vector corresponding to the media is used to represent content of the media. For example, the content of the media may be text information or a keyword displayed in the media, or information transferred by the media. An example in which the media is a picture is used, and content of the picture may be text included in the picture, information expressed by the picture, or the like. A distance value between a word characteristic vector corresponding to the first object and a word vector corresponding to the media may reflect a degree of correlation between the first object and the content of the media. A smaller distance value indicates a higher correlation degree.

There may be a plurality of conditions that need to be met for the distance value between the feature vector of the first object and the feature vector corresponding to the first media. For example, the conditions may be some or all of the following: the distance value is minimum and the distance value is within a preset range.

That the distance value is minimum indicates that the first media is content that is in the media set and that is most correlated to the first object.

For the distance value, a relatively small range may be set as the preset range. If the distance value between the feature vector corresponding to the media and the feature vector corresponding to the first object is within the preset range, it indicates that the content of the media is relatively correlated to the first object. If distance values between feature vectors corresponding to a plurality of pieces of media in the media set and the feature vector corresponding to the first object are within the preset range, the media server may randomly select one piece of media from the plurality of pieces of media as the first media. In another possible implementation, priorities may also be set for the media in the media set, and the media server may select a piece of media with a higher priority as the first media based on the priorities of the plurality of pieces media. The foregoing manner of selecting the first media is merely an example for description, and another manner of selecting the first media is not limited in this embodiment of this application.

In this embodiment of this application, composition and a type of the second network model are not limited, and the second network model may be a neural network model.

The following briefly describes a manner of generating the second network model through training by using an example in which the second network model is the neural network model, a device that generates the first network model is the media server, and a feature vector determined by the second network model is a word vector.

It should be noted that the device that generates the second network model is not limited in this embodiment of this application. Alternatively, another server may generate the second network model through training, and then send the second network model to the media server.

First, the media server establishes a corpus.

The corpus includes text information of a plurality of pieces of sample media. The text information may be a statement and a keyword in sample media, a text displayed in an image in the sample media, and the like. Any information that can represent content of the media is applicable to this embodiment of this application.

A manner of establishing the corpus is not limited in this embodiment of this application. For example, the media may be collected from video platforms or television stations, or the content of the media may be obtained from web sites by using a crawler script. For example, content of a plurality of different advertisements may be obtained from networks.

Then, the media server trains the second network model.

For example, the second network model may be a continuous bag of words (CBOW) model under a hierarchical softmax framework. The hierarchical softmax framework is a word vector model framework using a Huffman tree. The CBOW model is a model in which a network structure is added to the Huffman tree and that is for constructing a word vector.

The text information (for example, a statement and a keyword) in the corpus is used as an input value of the second network model. Further, the text information may be converted into a vector according to a specific rule (for example, an arrangement sequence) and used as the input value of the second network model. A feature vector corresponding to the media is used as an output value of the second network model. A learning algorithm (for example, a supervised learning algorithm) is used to train the neural network model, and determine a weight of the neural network model.

The trained neural network model may achieve the following effects. A distance value between feature vectors corresponding to any two pieces of related text information needs to be greater than a distance value between feature vectors corresponding to any two pieces of unrelated text information. For any media, if a degree of correlation between the media and second media is greater than a degree of correlation between the media and third media, a distance value between a feature vector corresponding to the media and a feature vector corresponding to the second media needs to be less than a distance value between the feature vector corresponding to the media and a feature vector corresponding to the third media. For example, a distance value between a feature vector corresponding to a picture of a pet type and a feature vector corresponding to a picture of a dog food type needs to be greater than a distance value between a feature vector corresponding to a picture of a fitness type and a feature vector corresponding to a picture of a maternal and infant type. A distance value between a feature vector corresponding to a picture of a beer type and a feature vector corresponding to a picture of a football type needs to be less than a distance value between the feature vector corresponding to the picture of a beer type and a feature vector corresponding to a picture of a basketball type (it is generally considered that beer is selected when a football game is watched, and carbonated beverage is generally selected when a basketball game is watched).

It should be noted that a distance value between two feature vectors may be a Euclidean distance between the two feature vectors, namely, a Euclidean distance D:

$$D = \sqrt[2]{\sum_{k=1}^{n}(x_{1k} - x_{2k})^2}$$

between a feature vector x1 ($x_{11}, x_{12}, \ldots, x_{1n}$) and a feature vector x2 ($x_{21}, x_{22}, \ldots, x_{2n}$), or may be another distance value, for example, an inverse cosine distance:

$$\cos\theta = \frac{\sum_{i=1}^{n} x_{1i} - x_{2i}}{\sqrt{\sum_{i=1}^{n}(x_{1i})^2}\sqrt{\sum_{i=1}^{n}(x_{2i})^2}},$$

or may be another distance value calculation manner. This is not limited in this embodiment of this application.

Whether any two pieces of text information are determined to be correlated may be that the two pieces of text information include similar words, and a degree of correlation between the two pieces of text information is measured by using a quantity of similar words. If there is no similar word, it is considered that there is no correlation, and a ratio of a quantity of similar words that occupy one piece of text information represents the degree of correlation. Alternatively, the degree of correlation may be determined by using an output result of another neural network model. The other neural network model may be trained in advance based on text information of a determined degree of correlation, and then the degree of correlation between the two pieces of text information is measured based on the output result of the another neural network model. Alternatively, a correlation function may be used for determining the degree of correlation. A manner of determining whether the two pieces of text information are correlated and the degree of correlation between the two pieces of text information is not limited in this embodiment of this application.

Composition of the second network model is not limited in this embodiment of this application. For example, the second network model may be a neural network model including several convolutional layers, or may be a neural network model with a known structure, for example, a CBOW model.

Figure 4:
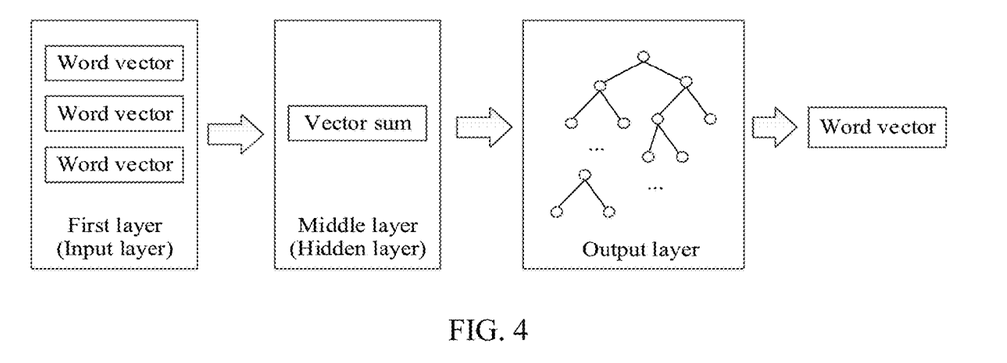
FIG. 4 is a schematic structural diagram of a second network model according to this application.

The following briefly describes the CBOW model. The CBOW model may be divided into three layers: an input layer, a hidden layer, and an output layer. A structure of the CBOW model is shown in FIG. 4.

A first layer is the input layer, and an input value may be vectors of several words. In other words, a word is represented in a form of a vector. Essentially, the vectors of several input words may also be considered as word vectors. A word may be converted into a vector according to a preset rule. For example, the word may be converted into the vector based on an arrangement sequence of the word in the corpus. For example, if the word is arranged as the first word, the word is converted into a first vector.

A middle layer is the hidden layer, and generates an accumulated sum of several word vectors of the input layer. An output value of the hidden layer is a vector. A third layer is an output layer, and the output layer is a binary tree. An output node of the hidden layer is connected to all non-leaf nodes of the binary tree. Further, the binary tree may be a Huffman tree, and each non-leaf node of the Huffman tree may represent a word vector. The vector represented by the non-leaf node is not a specific word, but words of a category. Each leaf node may also represent a word vector. The several input word vectors may be the same as one or more leaf nodes of the Huffman tree, and a word vector finally output by the output layer may be the same as or different from the input word vector, and is only semantically related with the input word vector. All leaf nodes of the Huffman tree may represent content of all sample media in the corpus. Each leaf node represents content (such as a statement, a keyword, and a word) of one piece of sample media in the corpus, and sample media represented by each leaf node may be different.

After training of the second network model is completed, the second network model may be used to output a word vector. When the word vector corresponding to the first object is determined, the name of the first object may be converted into a form of a vector according to a preset rule, and input into the second network model. The output value of the second network model is used as the word vector corresponding to the first object. When a word vector corresponding to media in the media set is determined, text information (such as a media word and a keyword) of the media may be converted into a form of a vector according to a preset rule, and input to the second network model. The output value of the second network model is used as the word vector corresponding to the media.

Then, the media server determines, based on a distance value between the word vector corresponding to the first object and the word vector corresponding to the media in the media set, the first media that meets the condition.

After determining the first media, the media server may cover the target region of the first video with the first media.

The first video includes a plurality of image frames, and a preset region may be set in one or more image frames in the first video. For example, one or more top corner locations in an image frame are the preset region, or a lower half part of the image frame is the preset region. The target region of the first video is the preset region in the image frame in the first video.

It should be noted that, in this embodiment of this application, it is not limited that there is a preset region in each image frame in the first video, and it is allowed that there is no preset region in one or more image frames in the first video. In other words, the media server may cover, with the first media, only preset regions in some image frames in the first video. Preset regions of different image frames may be the same or may be different. For example, a preset region of an image frame 1 in the first video may be a rectangular region at the lower left corner of the image frame 1. A preset region of an image frame 2 in the first video may be a rectangular region at the upper right corner of the image frame 2. A setting manner of the target region of the first video is not limited in this embodiment of this application. The target region of the first video may be pre-marked, or may be determined after detection performed by the media server. For example, the media server may analyze the image frame in the first video, detect brightness and a change trend of pixels in each image frame, and may use, as a specified region (namely, the target region) of the image frame, a region in which edge regions in the image frame have same brightness of pixels or pixel values do not change obviously (for example, a difference between pixel values of adjacent pixels is less than a threshold).

When covering the target region of the first video with the first media, the media server may adjust the first media based on a size and a shape of the target region of the first video. After a size and a shape of the first media are adjusted to be consistent with the size and the shape of the target region of the first video, the media server covers the target region of the first video with the adjusted first media.

In addition, the first object included in each image frame in the first video may be different. For example, a same type of a first object 1 exists in consecutive image frames in the first video, and a same type of a first object 2 exists in other consecutive image frames in the first video. In this case, a preset region of an image frame including the first object 1 may be covered with media matching the first object 1, and a preset region of an image frame including the first object 2 may be covered with media matching the first object 2.

The media server generates an integrated video file after covering the target region of the first video with the first media. The integrated video file is a video file of the first video in which the target region of the first video is covered with the first media.

It can be learned from the foregoing process that the first object is actually an object applicable to recommended media. That is, as long as the first object exists in the video, corresponding media may be displayed in the target region of the first video, so that the media can be implanted in a relatively targeted manner.

The media processing manner provided in this embodiment of this application may be applied to a plurality of different media implanting scenarios such as advertisement implanting, video insertion, and synchronous display of a video and a picture. The advertisement insertion is used as an example. In the manner in this embodiment of this application, a video that needs to be played may have a plurality of title sponsors and sponsors, and advertisements of these title sponsors and sponsors may be played as required in a video playing process. For example, if the played first video is a pet movie, and a mother-baby advertisement is implanted, a relatively good advertisement effect cannot be achieved. If a pet food advertisement is implanted, interests of users can be better attracted. In the manner in this embodiment of this application, the first object may be determined from the first video. For example, it is determined that the first object existing in the pet movie is a dog, and then the pet food advertisement is matched from a plurality of advertisement sets. Then, the target region of the first video is covered with the pet food advertisement. This can implement automatic media implantation, and is more flexible and more targeted.

In addition to the first object, there may be an object of another type in the first video. For example, a display location of media, for example, a wall, a billboard, a light board, or an exhibition board in the video, can be displayed in the first video.

Figure 5:
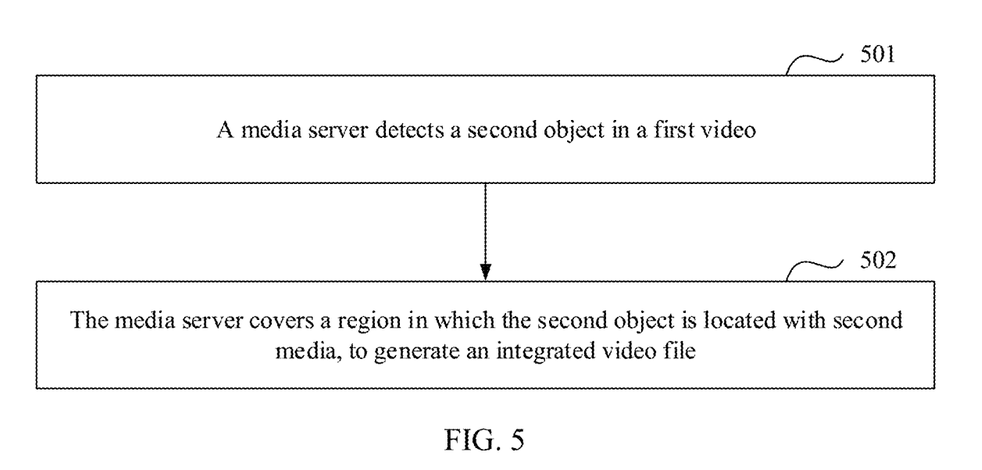
FIG. 5 is a schematic diagram of a method for integrating media into a region in which a second object is located according to this application.

In this embodiment of this application, the display location in the video is referred to as a second object. If the second object exists in the first video, the media server may also integrate the media in the first video. FIG. 5 is a schematic diagram in which the media server also integrates media in a region in which the second object is located. The method includes the following steps.

Step 501: The media server detects the second object in the first video.

For example, the media server needs to detect whether the second object exists in each image frame in the first video.

Step 502: The media server covers a region in which the second object is located with second media, to generate an integrated video file.

In a possible implementation, the media server may first detect the second object in a first image frame in the first video. The first image frame may be any frame in the first video, or may be the first frame (or an initial frame) of the first video.

A method for detecting the second object in the first image frame is not limited in this embodiment of this application. For example, a third network model may be configured in the media server. The third network model is used to detect the second object in the video, and may be further used to determine the region in which the second object is located, for example, coordinates of the region in which the second object is located.

In this embodiment of this application, composition and a type of the third network model are not limited, and the third network model may be a neural network model.

The following briefly describes a manner of generating the third network model through training by using an example in which the third network model is a neural network model and a device that generates the third network model is the media server.

It should be noted that the device that generates the third network model is not limited in this embodiment of this application. Alternatively, another server may generate the third network model through training, and then send the third network model to the media server.

First, the media server establishes a sample set. The sample set includes a plurality of sample images, and whether the sample image includes the second object and the region in which the second object is located has been marked in each sample image. For example, an identifier may be set for each sample image to indicate whether the sample image includes the second object. If the identifier is a first value (for example, 1), it indicates that the sample image includes the second object. For a sample image that includes the second object, the region in which the second object is located needs to be further determined (for example, coordinates of a marked region are location information). If the identifier is a second value (for example, 0), it indicates that the sample image does not include the second object.

Then, the media server trains the third network model.

A sample image in the sample set is used as an input value of the third network model, and an identifier of a corresponding sample image in the sample set and the region in which the second object is located are used as output values of the third network model. The third network model is trained by using a stochastic gradient descent method, to determine a weight of the third network model.

Composition of the third network model is not limited in this embodiment of this application. For example, the third network model may be a neural network model including several convolutional layers, or may be a neural network model with a known structure, for example, a Mask-Region Based Convolutional Neural Networks (RCNN) network model.

The third network model may detect the second object in any image frame (for example, the first image frame) in the first video. The media server may detect each image frame in the first video, to determine the second object in all image frames in the first video.

In another possible implementation, the media server may detect only the second object in one image frame (for example, the first image frame) in the first video based on the third network model. For another image frame in the first video, the media server may determine, by using a tracking algorithm, the second object in an image frame in the first video other than the first image frame. The tracing algorithm may be a Lucas-Kanade (LK) optical flow algorithm, or may be another tracing algorithm.

It should be noted that, if the third network model is the Mask-RCNN model, a region that is determined by the Mask-RCNN model and in which the second object is located cannot well cover the second object. For example, the region determined by the Mask-RCNN model may further include a part that is not the second object. Four corner points of the second object in the first image frame may be obtained by using a watershed algorithm, to more accurately determine the region in which the second object in the first image frame is located.

The watershed algorithm is on the basis of a gradient of an image frame. The region in which the second object in the image frame is located is covered with a mask, and after the region covered by the mask is flooded, a corresponding quadrilateral region is obtained by performing flooding on the image frame. Four corner points of the quadrilateral region are marked. The four corner points of the quadrilateral region are the four corner points of the second object.

After determining the region in which the second object in the first image frame is located, the media server may first track a particular region (the particular region is expressed as coordinates of a feature point set in the first image frame) in the first image frame by using the tracking algorithm. The media server determines a change trend of the particular region from the first image frame to a second image frame in the first video, and a location of the particular region in the second image frame (expressed as coordinates of a feature point set in the second image frame). The media server may determine a change matrix of coordinates by using the coordinates of the feature point set in the first image frame and the coordinates of the feature point set in the second image frame. Then, based on the change matrix, the region in which the second object in the first image frame is located is converted into a region in which the second object in the second image frame is located (in other words, coordinates of the region in which the second object in the first image frame is located are converted into coordinates of the region in which the second object in the second image frame is located). The second image frame is any image frame other than the first image frame in the first video.

In this embodiment of this application, a quantity of first image frames is not limited. In other words, the media server may determine regions in which the second object is located in the plurality of first image frames. Then, the media server determines, by using the tracking algorithm, a region in which the second object in an image frame adjacent to each first image frame is located. In this manner, the region in which the second object is located in the first video can be more accurately marked. In addition, if a plurality of different scenarios is presented in the first video, display locations in the different scenarios are usually different. In this case, different first image frames may be separately selected in the different scenarios in the first video. For example, the first video stores three different scenarios. Image frame sequence numbers corresponding to a scenario 1 are 1 to 70, image frame sequence numbers corresponding to a scenario 2 are 71 to 120, and image frame sequence numbers corresponding to a scenario 3 are 121 to 160. For the scenario 1, an image frame whose image frame sequence number is 1 is selected as the first image frame. The media server detects the second object in the image frame whose sequence number is 1, and determines, by using the tracking algorithm, the second object in image frames whose sequence numbers are 2 to 70. For the scenario 2, similar to the scenario 1, an image frame whose image frame sequence number is 71 is selected as the first image frame. The media server detects the second object in the image frame whose sequence number is 71, and determines, by using the tracking algorithm, the second object in image frames whose sequence numbers are 72 to 120. This is similar to scenario 3, and details are not described herein again.

After the second object in the first video is determined, the second object may not exist in each image frame in the first video. When integrating the second media in the first video, the media server may determine, only for an image frame in which the second object is located and that is in the first video, a region in which the second object is located in the image frame. Then, the media server covers the region in which the second object is located with the second media, to generate an integrated video file.

The media server may cover different image frames with same or different second media. This is not limited in this embodiment of this application. For example, the media server may cover, with second media 1, regions in which the second object is located in first N consecutive image frames in the first video. The media server may cover, with second media 2, regions in which the second object is located in the $N+1^{th}$ to $N+M^{th}$ image frames in the first video, where N and M are positive integers.

When covering the region in which the second object is located with the second media, the media server may adjust the second media based on a size and a shape of the region in which the second object is located. After the second media is adjusted to be consistent with the size and the shape of the region in which the second object is located, the region in which the second object is located is covered with the adjusted second media. Then, because there may be a sudden change between a pixel value of an edge of the region in which the second object is located and a pixel value of an edge of the second media, direct covering causes that there is no relatively good transition between the second media and the image frame of the first video, and a display effect is relatively poor. Gaussian smoothing may be performed on the edge of the second media, to improve the display effect. In other words, average value processing is performed, by using a Gaussian filter, on the pixel value of the edge of the second media and the pixel value of the edge of the region in which the second object is located, to obtain an average pixel value. The pixel value of the edge of the second media is adjusted to the average pixel value, to achieve a smooth transition effect.

After covering the region in which the second object is located with the second media and performing Gaussian smoothing on the edge of the second media, the media server may generate an integrated video file. The integrated video file is a video file of the first video that covers the target region of the first video with the first media and that covers the region in which the second object is located with the second media.

The second media may be media in the media set, may be other media, or may be a preset picture, a preset video, or the like.

As shown in FIG. 6A to FIG. 6D, an example in which the third network model is the Mask-RCNN model is used, and a flowchart of implanting the second media in the region in which the second object is located is shown.

First, as shown in 6A, the first image frame in the first video is input into the Mask-RCNN model, and in the Mask-RCNN model, a feature image is output by using a convolutional neural network (CNN) and a region proposal network (RPN). Sizes (such as a height and a width) of the output feature map is output after the first image frame passes through a region of interest alignment (ROIAlign) layer. Then, after the first image frame passes through a series of operations and a fully connected layer, the second object is determined to exist in the first image frame in the first video, and the second object is corresponding to an output of box regression and a classification algorithm in FIG. 6A. In addition, the region in which the second object is located may be further determined, and the second object is corresponding to an output of a mask branch in FIG. 6A.

Figure 6A:
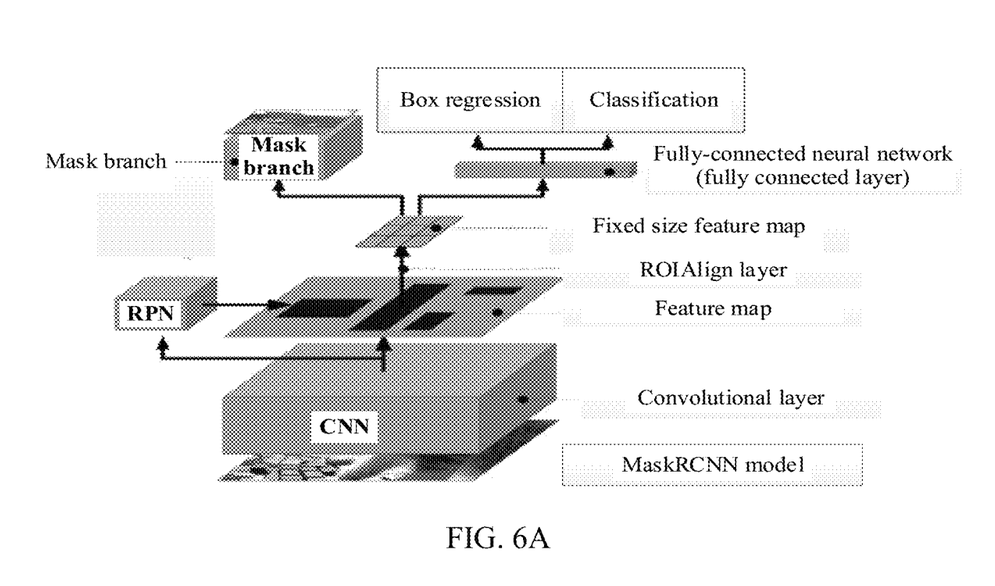
FIG. 6A is a schematic diagram of a processing procedure of a Mask-RCNN model according to this application.
Figure 6B:
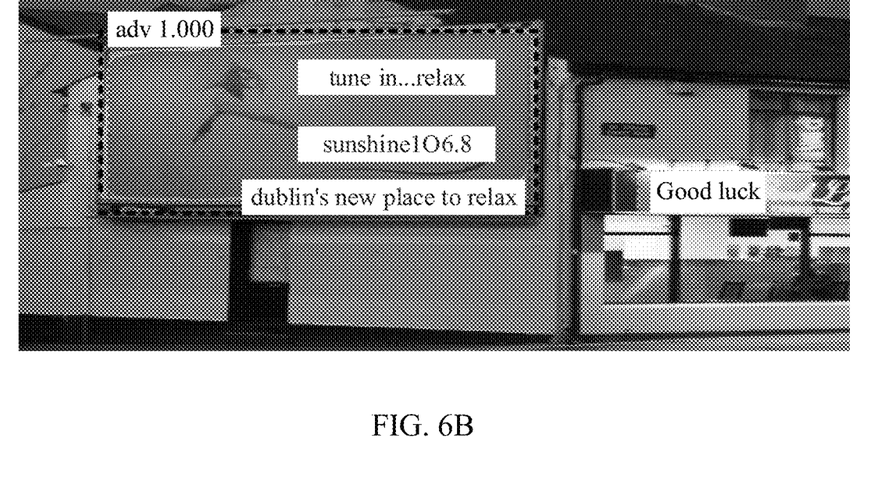
FIG. 6B is a schematic diagram of a region in which a second object is located according to this application.

As shown in FIG. 6B, the second object may be preliminarily identified by using the Mask-RCNN model, and the region (shown by a dashed box in FIG. 6B) in which the second object is located may be roughly determined.

Figure 6C:
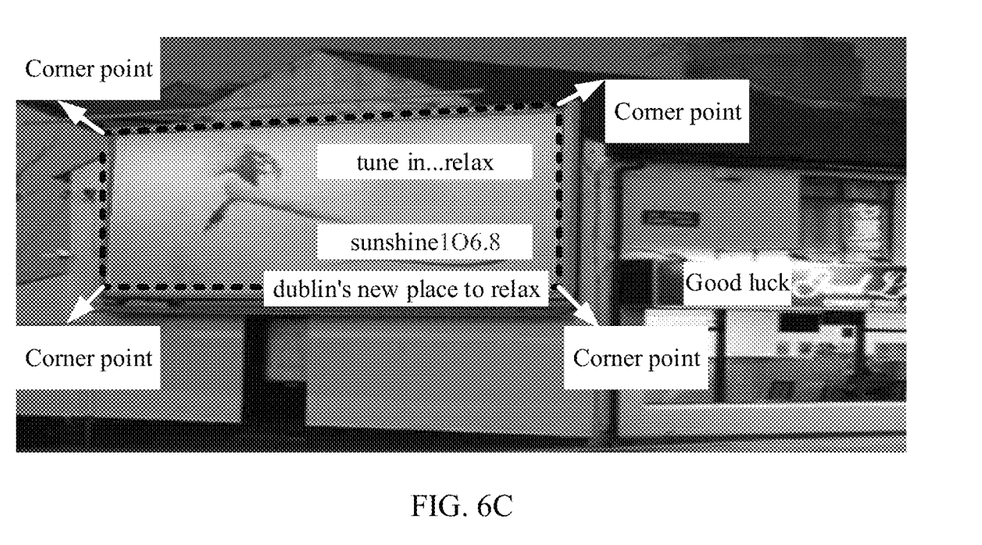
FIG. 6C is a schematic diagram of four corner points of a second object according to this application.
Figure 6D:
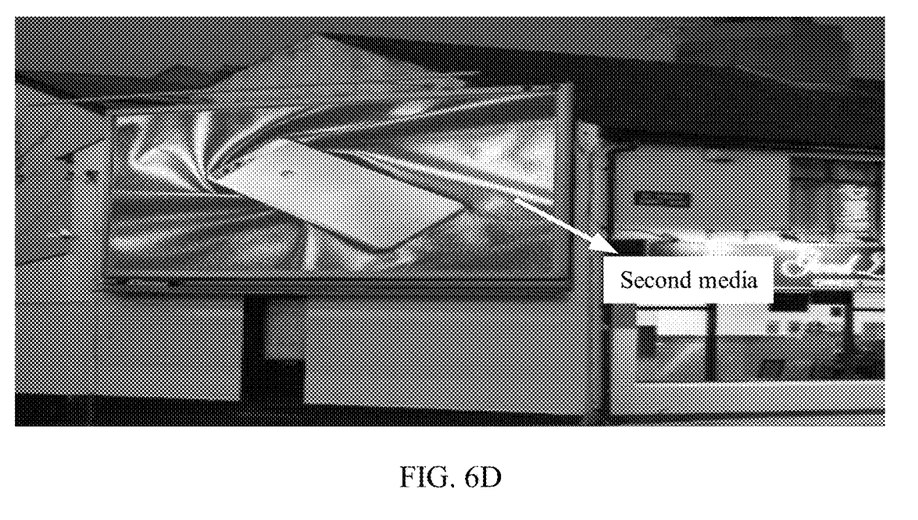
FIG. 6D is a schematic diagram of covering a region in which a second object is located with second media according to this application.

Then, as shown in FIG. 6C, the four corner points of the second object in the first image frame are determined by using the watershed algorithm. The four corner points are four corner points of the region in which the second object is located. Coordinates of the region in which the second object is located (for example, coordinates of the corner points) are optimized. Then, as shown in FIG. 6D, the second media is covered in the region that has been optimized and in which the second object is located.

Figure 7:
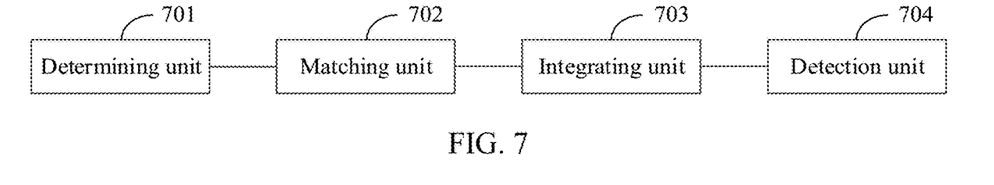
FIG. 7 is a schematic structural diagram of a media server according to this application.

Similar to the method embodiments, an embodiment of the present disclosure provides a media server 700, which is further configured to implement the method performed by the device in the foregoing method embodiments. A structure of the apparatus is shown in FIG. 7, and the apparatus includes a determining unit 701, a matching unit 702, and an integrating unit 703.

The determining unit 701 is configured to determine, based on a first network model, a first object existing in a first video. The first network model is generated through training based on a sample image that includes the first object.

The matching unit 702 is configured to determine, from a media set, first media that matches the first object. The first object is associated with content of the first media.

The integrating unit 703 is configured to cover a target region of the first video with the first media, to generate an integrated video file.

In a possible design, in a training process of the first network model, the sample image is inputted, and a label of the sample image is outputted. The label of the sample image is predetermined and is used to indicate whether the first object exists in the sample image. When the label is a first value, it indicates that the first object exists in the sample image. When the label is a second value, it indicates that the first object does not exist in the sample image. When the first network model processes the first video, the first video is used as an input, and the first label is used as an output. The first label is used to indicate that the first object exists in the first video.

In a possible implementation, when determining, from the media set, the first media that matches the first object, the matching unit 702 may generate, based on the second network model, a feature vector corresponding to the first object and a feature vector corresponding to each media in the media set, and determine, based on a distance value between the feature vector corresponding to the first object and the feature vector corresponding to each media in the media set, the first media, where a distance value between a feature vector corresponding to the first media in the media set and the feature vector corresponding to the first object meets a condition.

In a possible implementation, the feature vector is a word vector. For example, the word vector corresponding to the first object may represent a name of the first object, and the word vector corresponding to each media in the media set may represent content of the media.

In a possible implementation, the condition includes at least one of the following: the distance value is minimum and the distance value is within a preset range.

In a possible implementation, the apparatus further includes a detection unit 704. The detection unit 704 is configured to detect a second object in the first video. The integrating unit 703 may further cover a region in which the second object is located with second media, to generate an integrated video file.

In a possible implementation, when detecting the second object in the first video, the detection unit 704 may first detect the second object in a first image frame in the first video, and determine, by using a tracking algorithm, the second object in an image frame in the first video other than the first image frame.

In a possible implementation, when covering the region in which the second object is located with the second media, for any image frame of the second object in the first video, the integrating unit 703 may cover the region in which the second object is located with the second media.

In a possible implementation, after covering the region in which the second object is located with the second media, the integrating unit 703 may further perform Gaussian smoothing on an edge of the second media, to generate an integrated video file.

Division into units in the embodiments of this application is an example, is merely logical function division, and may be other division in an actual implementation. In addition, functional units in the embodiments of this application may be integrated in one processor, or may exist alone physically, or two or more units are integrated into one module. The foregoing integrated unit may be implemented in a form of hardware, or may be implemented in a form of a software functional module.

When the integrated unit is implemented in a form of a software functional unit and sold or used as an independent product, the integrated unit may be stored in a computer-readable storage medium. Based on such an understanding, the technical solutions of this application essentially, or the part contributing to the conventional technology, or all or some of the technical solutions may be implemented in the form of a software product. The computer software product is stored in a storage medium and includes several instructions for instructing a terminal device (which may be a personal computer, mobile phone, or a network device and the like) or a processor to perform all or some of the steps of the methods in the embodiments of this application. The foregoing storage medium includes any medium that can store program code, such as a Universal Serial Bus (USB) flash drive, a removable hard disk, a read-only memory (ROM), a random-access memory (RAM), a magnetic disk, or an optical disc.

In the embodiments of this application, the media server may be presented in the form of functional modules obtained through division in an integrated manner. The "module" herein may be a specific application-specific integrated circuit (ASIC), a circuit, a processor and a memory that execute one or more software or firmware programs, an integrated logic circuit, and/or another component that can provide the foregoing functions.

Figure 8:
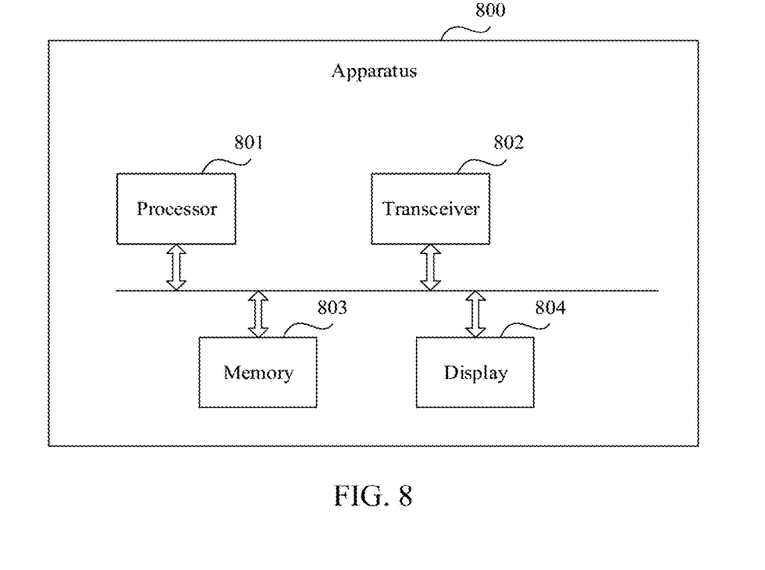
FIG. 8 is a schematic structural diagram of another media server according to this application.

In a simple embodiment, a person skilled in the art may figure out that the media server may use a form shown in FIG. 8.

An apparatus 800 shown in FIG. 8 includes at least one processor 801 and a memory 803, and optionally, may further include a transceiver 802.

In a possible implementation, the apparatus 800 may further include a display 804. The display 804 may be configured to display a video.

The memory 803 may be a volatile memory such as a RAM. Alternatively, the memory may be a non-volatile memory such as a ROM, a flash memory, a hard disk drive (HDD), or a solid-state drive (SSD). Alternatively, the memory 803 is any other medium that can be used to carry or store expected program code in a command or data structure form and that can be accessed by a computer. However, this is not limited. The memory 803 may be a combination of the foregoing memories.

A specific connection medium between the processor 801 and the memory 803 is not limited in this embodiment of this application.

The processor 801 may have a data receiving and sending function, and can communicate with another device. For example, in this embodiment of this application, the processor 801 may send an integrated file to the other device, or receive a first video from the another device. In the apparatus shown in FIG. 8, an independent data receiving and sending module may be disposed, for example, a transceiver 802 configured to receive and send data. When communicating with the other device, the processor 801 may transmit data by using the transceiver 802. For example, in this embodiment of this application, the processor 801 may send the integrated file to the other device by using the transceiver 802, or receive the first video from the another device by using the transceiver 802.

When the device is in the form shown in FIG. 8, the processor 801 in FIG. 8 may invoke a computer executable instruction stored in the memory 803, to enable the apparatus to perform the method performed by the first device in any one of the foregoing method embodiments.

Further, the memory 803 stores a computer executable instruction used to implement functions of the determining unit, the matching unit, the detection unit, and the integrating unit in FIG. 7. All functions/implementation processes of the determining unit, the matching unit, the detection unit, and the integrating unit in FIG. 7 may be implemented by the processor 801 in FIG. 8 by invoking the computer executable instruction stored in the memory 803.

A person skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, a compact disc (CD) ROM (CD-ROM), an optical memory, and the like) that include computer usable program code.

This application is described with reference to the flowcharts and/or block diagrams of the method, the device (system), and the computer program product according to this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a special-purpose computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer-readable memory that can instruct the computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the other programmable device, thereby generating computer-implemented processing. Therefore, the instructions executed on the computer or the other programmable device provide steps for implementing a specific function in one or more processes in the flowcharts and/or in one or more blocks in the block diagrams.

Obviously, a person skilled in the art can make various modifications and variations to this application without departing from the scope of this application. This application is intended to cover these modifications and variations of this application provided that they fall within the scope of protection defined by the following claims and their equivalent technologies.

What is claimed is:

1. A method comprising:
   determining, based on a first network model, a first object existing in a first video, wherein the first network model is generated through training based on a sample image that comprises the first object;
   generating, based on a second network model, a first feature vector corresponding to the first object and a second feature vector corresponding to each media in a media set; and
   determining, based on a distance value between the first feature vector and the second feature vector corresponding to each media in the media set, a first media in the media set that match the first object, wherein a distance value between the second feature vector of the first media and the first feature vector meets a condition, and wherein the first object is associated with content of the first media; and
   covering a target region of the first video with the first media to generate a first integrated video file.

2. The method of claim 1, wherein the first network model uses the first video as an input and a first label as an output, and wherein the first label indicates that the first object exists in the first video.

3. The method of claim 1, wherein the second network model is a continuous bag of words (CBOW) model under a hierarchical softmax framework.

4. The method of claim 3, wherein both the first feature vector and the second feature vector are word vectors.

5. The method of claim 3, wherein the condition comprises at least one of the following:
the distance value is minimum; or
the distance value is within a preset range.

6. The method of claim 1, further comprising:
detecting a second object in the first video; and
covering a first region in which the second object is located with a second media to generate a second integrated video file.

7. The method of claim 6, further comprising:
detecting the second object in a first image frame of the first video; and
determining, using a tracking algorithm, the second object in a second image frame of the first video, wherein the second image frame is different to the first image frame.

8. The method of claim 6, further comprising further covering, for a third image frame of the first video and that comprises the second object, the first region with the second media.

9. The method of claim 6, wherein after covering the first region with the second media, the method further comprises performing Gaussian smoothing on an edge of the second media.

10. A media server comprising:
a memory configured to store instructions; and
a processor coupled to the memory and configured to execute the instructions to cause the media server to:
determine, based on a first network model, a first object existing in a first video, wherein the first network model is generated through training based on a sample image that comprises the first object;
generate, based on a second network model, a feature vector corresponding to the first object and a feature vector corresponding to each media in a media set;
determine, based on a distance value between the first feature vector and the second feature vector corresponding to each media in the media set, a first media in the media set that match the first object, wherein a distance value between the second feature vector of the first media and the first feature vector meets a condition, and wherein the first object is associated with content of the first media; and
cover a target region of the first video with the first media to generate a first integrated video file.

11. The media server of claim 10, wherein the second network model is a continuous bag of words (CBOW) model under a hierarchical softmax framework.

12. The media server of claim 10, wherein the instructions further cause the processor to be configured to:
detect a second object in the first video; and
cover a first region in which the second object is located with a second media to generate a second integrated video file.

13. The media server of claim 12, wherein the instructions further cause the processor to be configured to:
detect the second object in a first image frame of the first video; and
determine, using a tracking algorithm, the second object in a second image frame of the first video, wherein the second image frame is different to the first image frame.

14. The media server of claim 12, wherein the instructions further cause the processor to be configured to cover, for a third image frame of the first video that comprises the second object, the first region with the second media.

15. The media server of claim 12, wherein after covering the first region with the second media, the instructions further cause the processor to be configured to perform Gaussian smoothing on an edge of the second media.

16. A computer program product comprising computer-executable instructions stored on a non-transitory computer-readable medium that, when executed by a processor, cause an apparatus to:
determine, based on a first network model, a first object existing in a first video, wherein the first network model is generated through training based on a sample image that comprises the first object;
generate, based on a second network model, a feature vector corresponding to the first object and a feature vector corresponding to each media in a media set;
determine, based on a distance value between the first feature vector and the second feature vector corresponding to each media in the media set, a first media in the media set that match the first object, wherein a distance value between the second feature vector of the first media and the first feature vector meets a condition, and wherein the first object is associated with content of the first media; and
cover a target region of the first video with the first media to generate a first integrated video file.

17. The computer program product of claim 16, wherein the second network model is a continuous bag of words (CBOW) model under a hierarchical softmax framework.

18. The computer program product of claim 16, wherein the computer-executable instructions further cause the apparatus to:
detect a second object in the first video; and
cover a first region in which the second object is located with a second media to generate a second integrated video file.

19. The computer program product of claim 18, wherein the computer-executable instructions further cause the apparatus to:
detect the second object in a first image frame of the first video; and
determine, using a tracking algorithm, the second object in a second image frame of the first video, wherein the second image frame is different to the first image frame.

20. The computer program product of claim 18, wherein the computer-executable instructions further cause the apparatus to cover, for a third image frame of the first video and that comprises the second object, the first region with the second media.

* * * * *